United States Patent [19]

Maruyama

[11] Patent Number: 4,750,070
[45] Date of Patent: Jun. 7, 1988

[54] THIN FILM MAGNETIC HEAD WITH A MAGNETIC GAP SPACER OF A THERMALLY DECOMPOSED POLYMER

[75] Inventor: Takao Maruyama, Tokyo, Japan
[73] Assignee: NEC Corporation, Japan
[21] Appl. No.: 27,267
[22] Filed: Mar. 18, 1987

[30] Foreign Application Priority Data

Mar. 19, 1986 [JP] Japan .................................. 61-63318

[51] Int. Cl.$^4$ ............................ G11B 5/16; G11B 5/22
[52] U.S. Cl. .................................. 360/113; 360/122; 360/123; 360/125
[58] Field of Search ............... 360/113, 122, 123, 125, 360/126, 129

[56] References Cited

U.S. PATENT DOCUMENTS 3,700,827  10/1972  Nagad ................................. 360/119
3,940,797  2/1976  Brock et al. ....................... 360/113

*Primary Examiner*—John H. Wolff
*Attorney, Agent, or Firm*—Laff, Whitesel, Conte & Saret

[57] ABSTRACT

A thin film magnetic head comprises a magnetic gap spacer layer interposed between two soft magnetic members at least one of which is formed in a thin film form. The magnetic gap spacer layer is made of a thermally decomposed polymer of a metallic compound represented by the formula, $M(OR1)m(R2)n-m$, where M is a metallic element selected from metals and metalloids which are elements intermediate in properties between the typical metals and non-metals, R1 being one selected from hydrogen and an alkyle group, R2 being an alkyle group, n being a valence of the metallic element, and m being an integer equal to or less than n. Typical ones of the metallic compound are tetraisopropyl titanate, tetranormalbutyl titanate, tetraalkoxysilane, organosilanol, and aluminum isopropylate. The metallic compound is solved in an organic solvent and is coated on a surface to be formed with the magnetic gap spacer. The coating is heat-treated at a lower temperature to thereby form the polymer. The polymer serves as an adhesive layer for adhering the two magnetic members.

20 Claims, 3 Drawing Sheets

THIN FILM MAGNETIC HEAD WITH A MAGNETIC GAP SPACER OF A THERMALLY DECOMPOSED POLYMER

BACKGROUND OF THE INVENTION

1. Field of the Invention

This invention relates to a magnetic head used in a magnetic recording device, and in particular, to a thin film magnetic head comprising at least one thin magnetic film.

2. Description of the Prior Art

The magnetic head is used for magnetically recording and/or reading information on a magnetic recording medium such as a magnetic tape, a magnetic disk, or the like.

Although a conventional magnetic head is a bulk type, the thin film magnetic head has been developed and come into actual use. Thin film magnetic heads of an inductive type are disclosed in, for example, U.S. Pat. No. 3,700,827 by Nagao assigned to Nippon Electric Company, Limited, and an article by Wakabayashi et al entitled "A THIN FILM MULTI-TRACK RECORDING HEAD" published in the IEEE TRANSACTIONS ON MAGNETICS, VOL. MAG-18, NO. 6, pages 1140-1142, November 1982. A thin film magnetic head of a magnetoresistive type is disclosed in, for example, U.S. Pat. No. 3,940,797 by Brock et al assigned to International Business Machines Corporation.

In the inductive type thin film magnetic head, at least one of magnetic members forming a magnetic headcore is formed in a thin film, and the two magnetic members are spaced apart from each other by a thin non-magnetic gap spacer layer to define a magnetic gap of the magnetic headcore.

In a certain type of the inductive type thin film magnetic head, a coil conductor and insulator layers are also formed as thin films.

Those thin film magnetic member or members, gap spacer layer, coil conductor and insulation layers are successively formed in a predetermined stacking sequence by the thin film forming technique such as the sputtering process. However, the use of the thin film forming technique has a disadvantage for a large-scaled production of magnetic heads.

In FIGS. 4a, 4b, and 5 in U.S. Pat. No. 3,700,827 as described above, a substrate having a thin film magnetic member is assembled and secured with another substrate having another thin film magnetic member and a gap spacer layer by use of adhesive, because the sputtered gap spacer layer does not have adhesive function.

A bonding glass has been known as a gap spacer material for the bulk type magnetic head. However, the bonding glass cannot be used as the magnetic gap for the thin film magnetic head because the bonding glass must be heat treated at a high temperature such as 400° C.-500° C. which badly affects the thin magnetic film so that the desired magnetic characteristic cannot be obtained.

In the magnetic head in FIG. 2 of U.S. Pat. No. 3,700,827 as described above, no guard plate is used. When the guard plate is desired, it cannot be directly bonded by use of the bonding glass.

In the above-described IEEE TRANSACTIONS ON MAGNETICS, a thick $SiO_2$ layer is formed and the guard plate is bonded thereon by use of the bonding glass.

A thin magnetic film has a desired pattern according to a desired recording track. Therefore, a surface after formation of the thin magnetic film has a step portion along the outer contour of the pattern of the thin magnetic film. The step portion cannot be removed by the next successively sputtered layer.

The step is removed by the bonding glass layer in the magnetic head as disclosed in the IEEE TRANSACTIONS ON MAGNETICS as described above.

However, if the gap spacer layer can be formed by a material which does not badly affect the thin magnetic film and which has the adhesive function, the thin film magnetic head can be easily produced by adhering two previously formed parts by use of the gap spacer material without sputtering the gap spacer layer. The bonding glass layer for adhering the guard plate can be omitted so that the guard plate can be adhered to the gap spacer through the thick $SiO_2$ layer sputtered thereon.

The magnetoresistive type magnetic head also comprises a gap spacer layer between a thin magnetic layer, that is, a magnetoresistive element and a magnetic shield. Any bonding layer is required to adhere the gap spacer layer and the magnetic shield. If any adhesive material, which does not badly affect the magnetoresistive element, can be used as the gap spacer layer, the sputtering process of the gap spacer layer can be advantageously omitted.

SUMMARY OF THE INVENTION

Therefore, an object of this invention is to provide a thin film magnetic head which is easily produced without degradation of the electromagnetic transducing characteristic by using an adhesive material for a gap spacer forming material.

As described above, a thin film magnetic head for magnetically recording and/or reading information on a magnetic recording medium comprises a first magnetic member of a soft magnetic material having a specific surface, a gap spacer layer overlying on and covering the specific surface of the first magnetic member, and a second magnetic member of a soft magnetic thin film, the second magnetic member having an opposite face spaced apart from the specific surface by the gap spacer layer, each of the first and second magnetic members and the gap spacer layer having a side surface facing the magnetic recording medium and lying in the same plane.

A thin film magnetic head according to this invention is characterized in that the gap spacer layer consists essentially of a thermally decomposed polymer of a metallic compound represented by the following formula;

$$M(OR1)m(R2)n-m \qquad (1),$$

where M denotes a metallic element selected from metals and metalloids which are elements intermediate in properties between the typical metals and non-metals, R1 indicating one selected from hydrogen and an alkyle group, R2 indicating an alkyle group, n being a valence of the metallic element, and m being an integer equal to or less than n.

In an aspect of this invention, the thin film magnetic head is an inductive type where the first and second magnetic members are connected to each other to form a magnetic headcore.

In another aspect of this invention, the thin film magnetic head is a magnetoresistive type wherein the first magnetic member is a shield plate and the second magnetic member is a magnetoresistive element.

DESCRIPTION OF THE PREFERRED EMBODIMENTS

Figure 1:
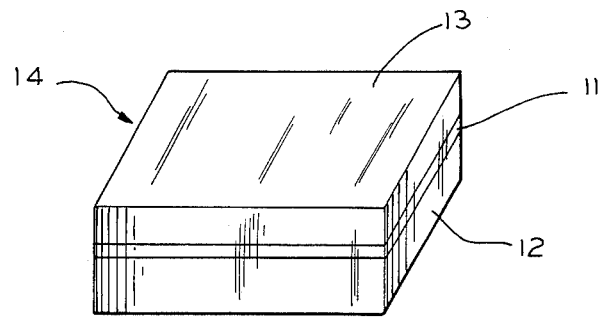
FIGS. 1-3 are perspective views for illustrating different steps for producing a thin film magnetic head according to an embodiment of this invention.
Figure 2:
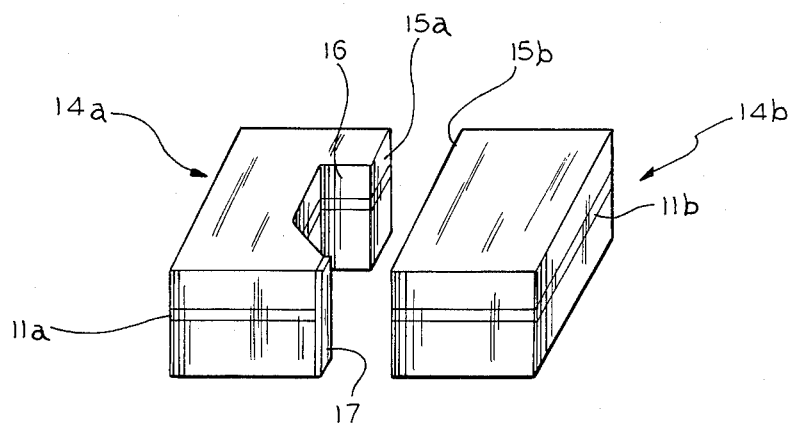
Figure 3:
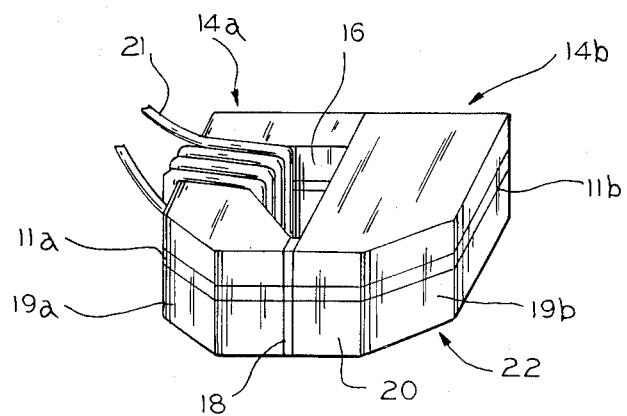

A thin film induction magnetic head according to an embodiment of this invention is described together with its manufacturing processes with reference to FIGS. 1-3.

Referring to FIG. 1, a magnetic thin film 11 of CoNbZr amorphous is formed by the sputtering technique on a surface of a non-magnetic substrate 12 of $Al_2O_3$- TiC ceramic. Then, a guard layer 13 of $Al_2O_3$ film is also formed by the sputtering technique on the magnetic thin film 12, to obtain a multi-layer plate body 14. Thereafter, the multi-layer plate body 14 is divided into two half pieces.

The magnetic thin film 11 can be made of a cobalt containing amorphous, for example, CoTaZr amorphous other than CoNbZr, Sendust or permalloy.

Other ceramic used for the substrate 12 is barium titanate, calcium titanate, or various non-magnetic ferrites.

The guard layer 13 can be made of $SiO_2$ instead of $Al_2O_3$.

Referring to FIG. 2, two divided pieces are shown at 14a and 14b, respectively, and have divided surfaces 15a and 15b, respectively. Those pieces 14a and 14b have divided thin magnetic films 11a and 11b, respectively. One divided piece 14a is formed with a groove 16 in the divided surface 15a. The divided surface 15a is partially left at both sides of the groove 16. One of the surfaces left at the both sides is polished and is coated with a gap spacer forming solution layer 17.

The gap spacer forming solution comprises a metallic compound, for example, organosilanol dissolved in an organic solvent, for example, toluene.

It is possible to use any metallic compound other than organosilanol, which is a chemical compound represented by the formula M(OR1)m(R2)n−m as described hereinbefore. Therefore, the gap spacer forming solution will be referred to as a metallic compound solution hereinafter.

One or more selected from alcohol, ketone, toluene, xylene, ethel, and ester can be used as the organic solvent.

The metallic compound solution is applied on the surface by means of, for example, a brush to form the coating layer 17 or by only dripping the solution.

Then, the two pieces 14a and 14b are combined together so that the partially left dividing surface 15a is in contact with the dividing surface 15b of the other piece 14b through the metallic compound solution layer 17, as shown in FIG. 3. While, at an opposite side to the solution layer 17 in reference to the groove 16, the dividing surfaces 15a and 15b are directly connected to thereby connect the magnetic films 11a and 11b so as to form a magnetic core. A heat treatment is carried out at a temperature of 200° C. for three hours under a pressure applied to the metallic compound solution layer 17 by pressing the piece 14b onto the other piece 14a to make the solution layer of a desired thickness.

By the heat treatment, the organic solvent is evaporated and the metallic compound is thermally decomposed to form a hard amorphous polymer layer 18 which is adhered or secured onto the pieces. The amorphous layer 18 has a thickness, for example, 0.5 μm and an adhesive strength of 280 Kg.f/cm² or more.

Thereafter, two adjacent corners of the combined body are cut out as shown at 19a and 19b in FIG. 3, and a side surface 20 extending between the cut-out surfaces 19a and 19b is polished to form a sliding surface 20 facing a magnetic recording medium.

Then, a coil 21 is wound on the piece 14a through the groove 16 and a thin film magnetic head 22 is completed.

In the completed thin film magnetic head 22, an annular magnetic core is formed by the thin magnetic films 11a and 11b and has a magnetic gap defined by the hard amorphous polymer layer 18. Therefore, the amorphous polymer layer 18 serves as the gap spacer layer in the magnetic head. The amorphous layer 18 and the magnetic thin film portions adjacent the amorphous layer 18 are exposed in the sliding surface 20.

A recess of the amorphous layer in the sliding surface 20 is quite small, for example, 500 Å depth or less and, therefore, the desired flat sliding surface is obtained.

In the embodiment of FIGS. 1-3, a non-magnetic guard plate can be adhered onto the thin magnetic film 11 by the use of the similar metallic compound solution instead of sputtering the guard layer 13.

Figure 4:
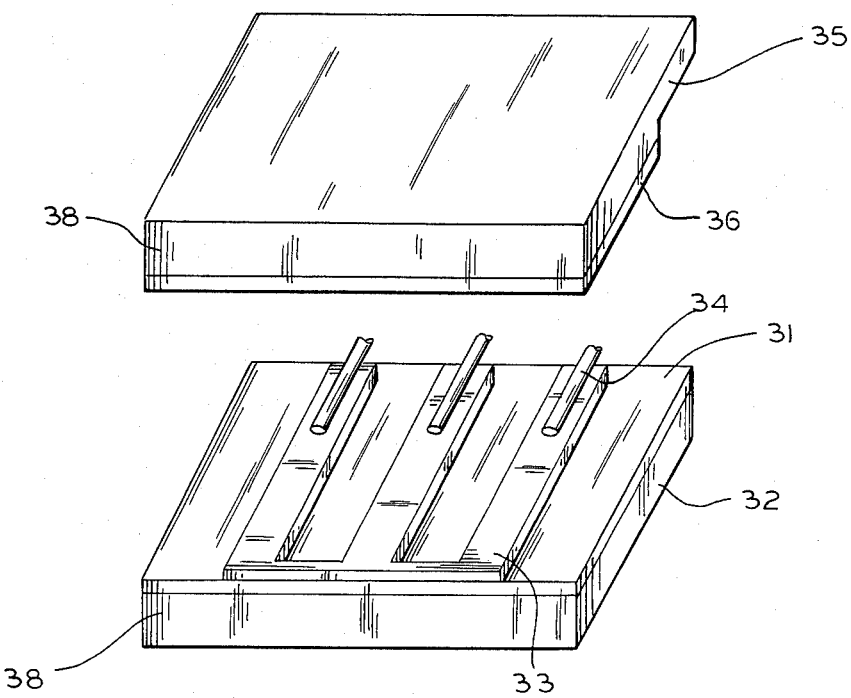
FIG. 4 is a perspective view for illustrating a step for producing a magnetoresistive type magnetic head according to another embodiment of this invention.
Figure 5:
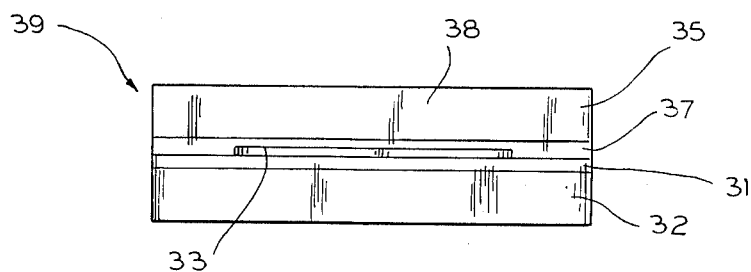
FIG. 5 is a front view of the magnetoresistive type magnetic head.

Referring to FIGS. 4 and 5, description is made as to a magnetoresistive type magnetic head according to another embodiment of this invention.

A non-magnetic and insulating layer 31 such as $SiO_2$ or $Al_2O_3$ film is formed on a surface of a magnetic shield 32 of a soft magnetic substrate such as Ni-Zn ferrite. A magnetoresistive element 33 is formed on the insulating layer 31 by etching process following after sputtering material, for example, permalloy exhibiting the magnetoresistive effect, titanium (Ti) and gold (Au) successively. Then, conductors 34 of copper are connected to the magnetoresistive element 33.

On the other hand, another magnetic shield 35 of a soft magnetic substrate such as Ni-Zn ferrite is prepared with an organosilanol solution layer 36 similar to the layer 17 in FIG. 2 being coated on a surface of the shield 35.

Thereafter, the magnetic shield 35 is overlaid on the other magnetic shield 36 so that the organosilanol solution layer 36 is in contact with the magnetoresistive element 33 and the insulating layer 31. Then, a heat treatment is performed at a temperature of 200° C. for three hours in a condition where the magnetic shield 35 is pressed onto the other magnetic shield 32. By the heat treatment, the organosilanol solution layer 36 is converted into a hard amorphous polymer layer 37 similar to the layer 18 in FIG. 3. The amorphous polymer layer 37 tightly adheres to the magnetic shield 35, the magnetoresistive element 33 and the insulating layer 31.

Thereafter, polishing is carried out onto a surface 38 of the adhered magnetic shields 32 and 35 to form a sliding surface for a magnetic recording medium. Thus, a magnetoresistive type magnetic head is completed.

FIG. 5 shows the sliding surface 38 of the complete magnetoresistive type magnetic head 39. The insulating layer 31, the magnetoresistive element 33, and the amorphous polymer layer 37 are exposed in the sliding surface 38, as shown in the figure. The amorphous polymer layer 37 is interposed between the magnetoresistive element 33 and the magnetic shield 35 and serves as a magnetic gap spacer therebetween. The amorphous layer 37 also fills up a space between the magnetic shield 35 and the insulating layer 31 and resolves a problem of a step between a top surface of the magnetoresistive element 33 and a surface of the insulating layer 31.

The sliding surface 38 is flat and a recess of the magnetoresistive element 33 in the sliding surface is quite small such as a depth of 400 Å or less. It was confirmed that the magnetoresistive element 33 was neither damaged nor affected in the specific resistance and the anisotropic magnetoresistivity ratio by the heat treatment.

Instead of organosilanol, it is possible to use other metallic compounds represented by the chemical formula (1) as described above.

A stress relaxation agent can be preferably used in the metallic compound solution. It was confirmed that the use of such a stress relaxation agent was effective for relaxing stress caused in the polymer as developed. Therefore, the polymer is freed from clacking at the heat treatment and also the magnetic film is not broken away at the heat treatment.

A useful stress relaxation agent is a silane coupling agent such as vinyl trichlorosilane, vinyl triethoxysilane, and vinyl tris (beta-methoxyethoxy) silane.

Figure 6:
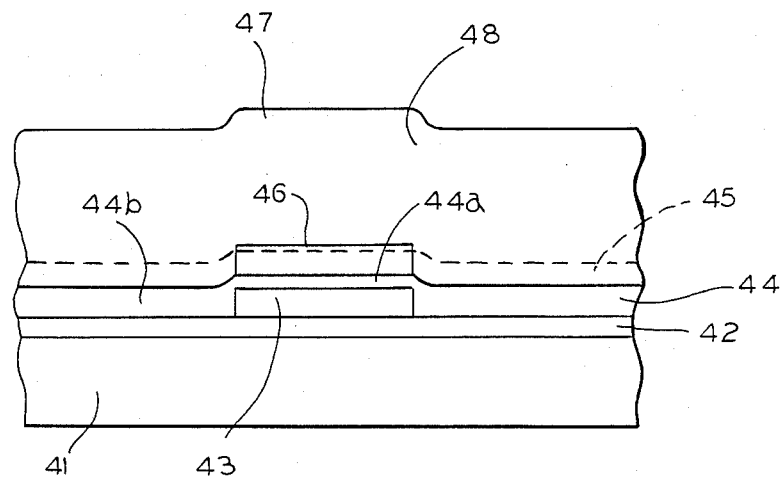
FIG. 6 is a front view of a thin film magnetic head according to a further embodiment of this invention.
Figure 7:
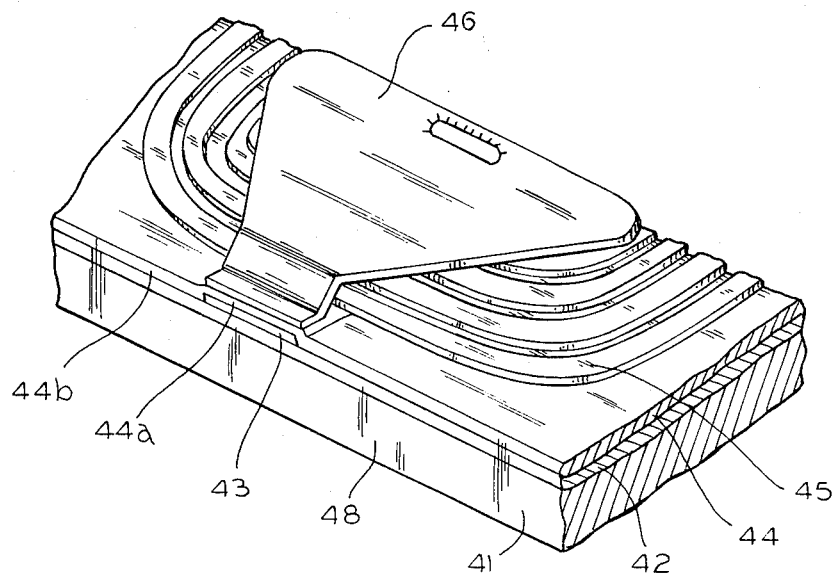
FIG. 7 is a fragmentary perspective view of the magnetic head of FIG. 6.

Referring to FIGS. 6 and 7, a thin film magnetic head according to a further embodiment is a slider head for a magnetic rigid disk and comprises a non-magnetic substrate 41, such as a Si-C ceramic, a sputtered insulating layer 42 of such as SiO2 film overlaid on a surface of the substrate 41, and a thin magnetic film 43. The thin magnetic film 43 is of, for example, permalloy and is formed with a predetermined pattern by etching following after sputtering.

A hard amorphous polymer layer 44 is formed to cover the thin magnetic film 43 and the insulating layer 42. The hard amorphous polymer layer 44 is formed by the following method.

A metallic compound solution, for example, a mixed solution comprising tetrahydroxysilane 11% ethyl alcohol solution 20 wt % and n-butyl alcohol 80 wt % is applied on the thin magnetic film 43 and the insulating layer 42 by spinning the substrate 41 at a rotational speed of 2000 r.p.m., and thereafter, heat-treated at a temperature of 100° C. for six hours in an electric furnace so that the amorphous polymer is formed.

Generally speaking, tetrahydroxysilane is produced by dehydrating condensation polymerization of tetraalkoxysilane (Si(OR)4, where R is an alkyl group such as methyl, ethyl, propyl, or butyl). Tetraalkoxysilane is soluble in lower alcohol and can be readily hydrolysed by water or calboxylic acid to produce tetrahydroxysilane.

The amorphous polymer layer 44 has a three dimensional network of Si and O and absorbs the step between a top surface of the thin magnetic film 43 and the surface of the insulating layer 42 so that the amorphous layer 44 has a relatively small thickness shown at 44a on the magnetic film 43 but a relatively large thickness as shown at 44b on the insulating layer 42. Therefore, a reduced step is only present in a surface of the polymer layer 44 in no relation to the relatively large step between the magnetic film 43 and the insulating layer 42.

A coil conductor layer 45 is formed on the amorphous polymer layer 44. It was confirmed that the conductor layer 45 was freed from damage because of the reduced surface step of the amorphous polymer layer 44.

Another thin magnetic film 46 is formed by sputtering on the conductor layer 45 and the amorphous polymer layer 44 and is etched into a predetermined shape. Thereafter, a guard layer 47 of, for example, SiO2 film is overlaid by sputtering. The guard layer 47 is not shown in FIG. 7.

Two thin magnetic films 43 and 46 are connected to each other by a magnetic connecting member (not shown) which extends through a center portion of the coil conductor 45, so that a magnetic core is formed with a magnetic gap defined by the amorphous polymer portion 44a. Therefore, the amorphous polymer portion 44a serves as a magnetic gap spacer. In this embodiment, the magnetic gap was formed with a reduced space, for example, about 0.1 μm.

A sliding surface 48 for the magnetic disk is polished, and end surfaces of magnetic films 43 and 46, amorphous polymer layer 44, and insulating layer 42 are exposed in the sliding surface.

A recess of the amorphous polymer layer 44 in the sliding surface 48 is quite small, for example, about 200 Å.

Instead of tetrahydroxysilane, it is also possible to use another metallic compound represented by the chemical formula (1) as described above.

In this embodiment, the stress relaxation agent can be preferably used by solving it in the metallic compound solution.

What is claimed is:

1. In a thin film magnetic head for magnetically recording and/or reading information on a magnetic recording medium comprising a first magnetic member of a soft magnetic material having a specific surface, a gap spacer layer overlying on and covering said specific surface of said first magnetic member, and a second magnetic member of a soft magnetic thin film said second magnetic member having an opposite face spaced apart from said specific surface by said gap spacer layer, each of said first and second magnetic members and said gap spacer layer having a side surface facing the magnetic recording medium and lying in the same plane, the improvement wherein said gap spacer layer consists essentially of a thermally decomposed polymer of a metallic compound represented by the following formula;

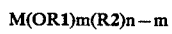

M(OR1)m(R2)n−m where M denotes a metallic element selected from metals and metalloids which are elements intermediate in properties between the typical metals and non-metals, R1 indicating one selected from hydrogen and an alkyle group, R2 indicating an alkyle group, n being a valence of the metallic element, and m being an integer equal to or less than n.

2. A thin film magnetic head according to claim 1, wherein said alkyl group comprises methyl, ethyl, propyl, butyl, 2-ethyl hexyl, stearyl, nonyl, cetyl, glycol, isopropylhexyleneglycol, and oleoyl.

3. A thin film magnetic head according to claim 2, wherein said metallic compound is one of tetraisopropyl titanate, tetranormalbutyl titanate, tetraalkoxysilane, organosilanol, and aluminum isopropylate.

4. A thin film magnetic head according to claim 1, wherein said gap spacer layer includes a stress relaxation agent dispersed therein.

5. A thin film magnetic head according to claim 4, wherein said stress relaxation agent is a silane coupling agent.

6. A thin film magnetic head according to claim 5, wherein said silane coupling agent is one of vinyl trichlorosilane, vinyl triethoxysilane, and vinyl tris(beta-methoxyethoxy) silane.

7. A thin film magnetic head according to claim 1, wherein said first and second magnetic members are connected to each other to form a magnetic headcore.

8. A thin film magnetic head according to claim 1, wherein said first magnetic member is a shield plate and said second magnetic member is a magnetoresistive element.

9. A thin film magnetic head for magnetically recording and/or reading information on a magnetic recording medium comprising;
a first block comprising a first non-magnetic substrate, a first soft magnetic thin film overlying on said first substrate, and a first insulator guard layer overlying on said first magnetic film, said first block having a first flat side surface on which said first substrate, said first magnetic film, and said guard layer are exposed, said first block having a first contact surface on which said first substrate, said first magnetic film, and said first guard layer are also exposed, said first substrate being formed with a groove in said first contact surface;
a coil being wound on said first block through said groove;
a second block comprising a second non-magnetic substrate, a second soft magnetic thin film overlying on said second substrate, and a second insulator guard layer overlying on said second magnetic film, said second block having a second flat side surface on which said second substrate, said second magnetic film, and said second guard layer are exposed, said second block having a second contact surface on which said second substrate, said second magnetic film, and said second guard layer are also exposed, said second block being in contact with each other at said first and second contact surfaces with said first and second side surfaces lying in the same plane to form a sliding surface for the magnetic recording medium;
a gap spacer layer being interposed between said first and second contact surfaces adjacent said first and second side surfaces, said gap spacer layer exposing in the same plane of said sliding surface, said gap spacer layer adhering said first and second blocks together, said gap spacer layer consisting essentially of a metallic compound represented by, M(OR1)m(R2)n−m where M denotes a metallic element selected from metals and metalloids which are elements intermediate in properties between the typical metals and non-metals, R1 indicating one selected from hydrogen and an alkyle group, R2 indicating an alkyle group, n being a valence of the metallic element, and m being an integer equal to or less than n.

10. A thin film magnetic head according to claim 9, wherein said gap spacer layer is formed by a method comprising steps of;
solving said metallic compound in an organic solvent to form a solution with an appropriate viscosity;
applying said solution onto said first contact surface of said first block adjacent said first side surface to form a solution coating with a predetermined thickness; and
heat treating said solution coating at a low temperature of 100° C.–200° C. under press of said second block onto said first block, so that said metallic compound is thermally decomposed to form the polymer with said solvent being evaporated.

11. A thin film magnetic head according to claim 10, wherein said metallic compound is organosilanol.

12. A magnetoresistive type magnetic head for magnetically recording and/or reading information on a magnetic recording medium comprising;
a first magnetic shield plate having a main surface and a first plate side end for defining a sliding surface for the magnetic recording medium;
an insulator layer overlying on said main surface of said first magnetic shield plate and having an insulator side end lying in the same plane of said first plate side end;
a magnetoresistive element having a predetermined pattern and being formed on said insulator layer, said magnetoresistive element having an element side end lying in the same plane of said first plate side end;
a second magnetic shield plate having a second plate side end lying in the same plane of said first plate side end; and
a gap spacer layer adhering said second magnetic shield plate onto said magnetoresistive element and said insulator layer, said gap spacer consisting essentially of a thermally decomposed polymer of a metallic compound represented by the following formula, M(OR1)m(R2)n−m where M denotes a metallic element selected from metals and metalloids which are elements intermediate in properties between the typical metals and non-metals, R1 indicating one selected from hydrogen and an alkyle group, R2 indicating an alkyle group, n being a valence of the metallic element, and m being an integer equal to or less than n.

13. A magnetoresistive type magnetic head according to claim 12, wherein said gap spacer layer further contains a stress relaxation agent dispersed therein.

14. A magnetoresistive type magnetic head according to claim 13, wherein said stress relaxation agent is one of vinyl trichlorosilane, vinyl triethoxysilane, and vinyl tris (beta-methoxyethoxy) silane.

15. A magnetoresistive type magnetic head according to claim 12, wherein said gap spacer layer is formed by a method comprising steps of;
solving said metallic compound in an organic solvent to form a solution with an appropriate viscosity;
applying said solution onto said second magnetic shield plate to form a solution coating with a predetermined thickness; and heat treating said solution coating at a low temperature of 100° C.–200° C. under press of said solution coating of the second magnetic shield plate onto said insulator layer and said magnetoresistive element, so that said metallic compound is thermally decomposed to form the polymer with said solvent being evaporated.

16. A thin film magnetic head for magnetically recording and/or reading information on a magnetic recording medium comprising;
   a non-magnetic substrate having a main surface and a substrate side end defining a sliding surface for said magnetic recording medium;
   an insulator layer overlying on the main surface of said non-magnetic substrate and having an insulator side end lying in the same plane of said substrate side end;
   a first magnetic thin film being formed on said insulator layer and having a predetermined pattern and a first film end lying in the same plane of said substrate side end;
   a gap spacer layer overlying on said insulator layer and said first magnetic thin film and having a spacer end lying in the same plane of said insulator side end, said gap spacer layer consisting essentially of a thermally decomposed polymer of a metallic compound represented by the following formula, $$M(OR1)m(R2)n-m$$

where M denotes a metallic element selected from metals and metalloids which are elements intermediate in properties between the typical metals and non-metals, R1 indicating one selected from hydrogen and an alkyle group, R2 indicating an alkyl group, n being a valence of the metallic element, and m being an integer equal to or less than n;
   a conductor layer with a coil pattern being formed on said gap spacer layer without any conductor end lying in the same plane of said substrate side end;
   a second magnetic film having a predetermined pattern and being formed in said gap spacer layer and said conductor layer, said second magnetic layer having a second film side end overlying on said gap spacer layer and lying in the same plane of said substrate side end, said second magnetic film being connected with said first magnetic film to form a magnetic headcore having a magnetic gap defined by said gap spacer layer interposed therebetween; and
   a non-magnetic guard layer overlying on said second magnetic film, said conductor layer, and said gap spacer layer.

17. A thin film magnetic head according to claim 16, wherein said gap spacer layer is formed by a method comprising steps of;
   solving said metallic compound in an organic solvent to form a solution with an appropriate viscosity;
   applying said solution onto said insulator layer and said first magnetic thin film to form a solution coating with a predetermined thickness; and
   heat treating said solution coating at a low temperature of 100° C.–200° C., so that said metallic compound is thermally decomposed to form the polymer with said solvent being evaporated.

18. A thin film magnetic head according to claim 17, wherein said metallic compound is tetrahydroxysilane.

19. A thin film magnetic head according to claim 16, wherein said gap spacer layer further contains a stress relaxation agent dispersed therein.

20. A thin film magnetic head according to claim 19, wherein said stress relaxation agent is one of vinyl trichlorosilane, vinyl triethoxysilane, and vinyl tris (beta-methoxyethoxy) silane.

* * * * *